United States Patent
Kakimoto et al.

(10) Patent No.: US 11,858,485 B2
(45) Date of Patent: Jan. 2, 2024

(54) STRADDLE TYPE VEHICLE, VEHICLE CONTROL APPARATUS, VEHICLE CONTROL METHOD, AND NON-TRANSITORY COMPUTER-READABLE STORAGE MEDIUM

(71) Applicant: HONDA MOTOR CO., LTD., Tokyo (JP)

(72) Inventors: Takaya Kakimoto, Tokyo (JP); Shogo Tatsumi, Tokyo (JP); Akiyuki Suzuki, Tokyo (JP); Shogo Nishida, Tokyo (JP); Takashi Sato, Tokyo (JP); Takayuki Abe, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 540 days.

(21) Appl. No.: 17/152,907

(22) Filed: Jan. 20, 2021

(65) Prior Publication Data
US 2021/0229649 A1  Jul. 29, 2021

(30) Foreign Application Priority Data

Jan. 29, 2020 (JP) .................. 2020-012805

(51) Int. Cl.
*B60T 13/74* (2006.01)
*B62L 3/02* (2006.01)

(52) U.S. Cl.
CPC ............. *B60T 13/741* (2013.01); *B62L 3/02* (2013.01)

(58) Field of Classification Search
CPC .................. B62L 3/02; B60T 13/741
See application file for complete search history.

(56) References Cited

U.S. PATENT DOCUMENTS

| 7,611,212 | B2 | 11/2009 | Nakayama et al. | |
| 8,490,998 | B1* | 7/2013 | Stevens | B62K 11/14 |
| | | | | 280/274 |
| 2006/0138857 | A1 | 6/2006 | Nakayama et al. | |
| 2007/0200430 | A1* | 8/2007 | Tani | B60T 8/4081 |
| | | | | 303/137 |
| 2012/0145493 | A1* | 6/2012 | Nishikawa | B60T 11/16 |
| | | | | 188/152 |
| 2016/0229473 | A1* | 8/2016 | Inoue | B60Q 1/14 |
| 2017/0088129 | A1* | 3/2017 | Iwasaki | B60W 10/06 |
| 2018/0201338 | A1* | 7/2018 | Henry | B62J 6/16 |
| 2018/0304946 | A1* | 10/2018 | Kuwabara | B62K 25/24 |
| 2020/0247491 | A1* | 8/2020 | Kuramochi | B62J 43/30 |
| 2020/0247494 | A1* | 8/2020 | Ichikawa | B62J 9/14 |

FOREIGN PATENT DOCUMENTS

JP     2006-176086 A    7/2006

* cited by examiner

*Primary Examiner* — Long T Tran
(74) *Attorney, Agent, or Firm* — Thomas | Horstemeyer, LLP (57) ABSTRACT

A straddle type vehicle including a vehicle control apparatus capable of controlling a brake by a brake-by-wire method, includes: a control unit configured to control the brake of the straddle type vehicle based on a signal from a brake operation unit; and a signal processing unit configured to supply power of a battery power supply of the straddle type vehicle to the control unit by a predetermined input operation in a handle locking state of the straddle type vehicle.

15 Claims, 6 Drawing Sheets

STRADDLE TYPE VEHICLE, VEHICLE CONTROL APPARATUS, VEHICLE CONTROL METHOD, AND NON-TRANSITORY COMPUTER-READABLE STORAGE MEDIUM

CROSS-REFERENCE TO RELATED APPLICATION(S)

This application claims priority to and the benefit of Japanese Patent Application No. 2020-012805 filed on Jan. 29, 2020, the entire disclosure of which is incorporated herein by reference.

BACKGROUND OF THE INVENTION

Field of the Invention

The present invention relates to a straddle type vehicle, a vehicle control apparatus, a vehicle control method, and a non-transitory computer-readable storage medium.

Description of the Related Art

Japanese Patent Laid-Open No. 2006-176086 discloses a technique concerning a brake-by-wire (BBW) brake system for generating a braking force in a vehicle wheel braking unit by electrically detecting an operation amount of a brake operation unit and causing a control apparatus to control an actuator based on the detection value, thereby generating a liquid pressure.

When the brake of a two-wheeled vehicle is to be electronically controlled by the brake-by-wire method, the vehicle wheel braking unit cannot generate a braking force in a stage before the control apparatus is energized after the release of handle locking. Accordingly, a state in which the brake is not temporarily actuated occurs. For example, when the two-wheeled vehicle is stopped along a slope and the driver tends to slightly move the vehicle, the driver must support the load based on the weight of the vehicle in some cases in the technique in Japanese Patent Laid-Open No. 2006-176086.

The present invention provides a technique capable of supplying the power of a battery power supply of the straddle type vehicle to a control unit by a predetermined input operation in a handle locking state.

SUMMARY OF THE INVENTION

According to one aspect of the present invention, there is provided a straddle type vehicle including a vehicle control apparatus capable of controlling a brake by a brake-by-wire method, comprising: a control unit configured to control the brake of the straddle type vehicle based on a signal from a brake operation unit; and a signal processing unit configured to supply power of a battery power supply of the straddle type vehicle to the control unit by a predetermined input operation in a handle locking state of the straddle type vehicle.

According to another aspect of the present invention, there is provided a vehicle control apparatus capable of controlling a brake of a vehicle by a brake-by-wire method, comprising: a control unit configured to control the brake of the vehicle based on a signal from a brake operation unit; and a signal processing unit configured to supply power of a battery power supply of the vehicle to the control unit by a predetermined input operation in a handle locking state of the vehicle.

According to still another aspect of the present invention, there is provided a vehicle control method in a vehicle control apparatus including a control unit configured to control a brake of a vehicle based on a signal from a brake operation unit, the vehicle control apparatus being capable of controlling the brake of the vehicle by a brake-by-wire method, comprising supplying power of a battery power supply of the vehicle to the control unit by a predetermined input operation in a handle locking state of the vehicle.

According to still yet another aspect of the present invention, there is provided a non-transitory computer-readable storage medium storing a program for causing a computer to execute a vehicle control method in a vehicle control apparatus including a control unit configured to control a brake of a vehicle based on a signal from a brake operation unit, the vehicle control apparatus being capable of controlling the brake of the vehicle by a brake-by-wire method, the vehicle control method comprising supplying power of a battery power supply of the vehicle to the control unit by a predetermined input operation in a handle locking state of the vehicle.

According to the present invention, it is possible to supply the power of the battery power supply of the straddle type vehicle to the control unit by the predetermined input operation in the handle locking state.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Figure 1:
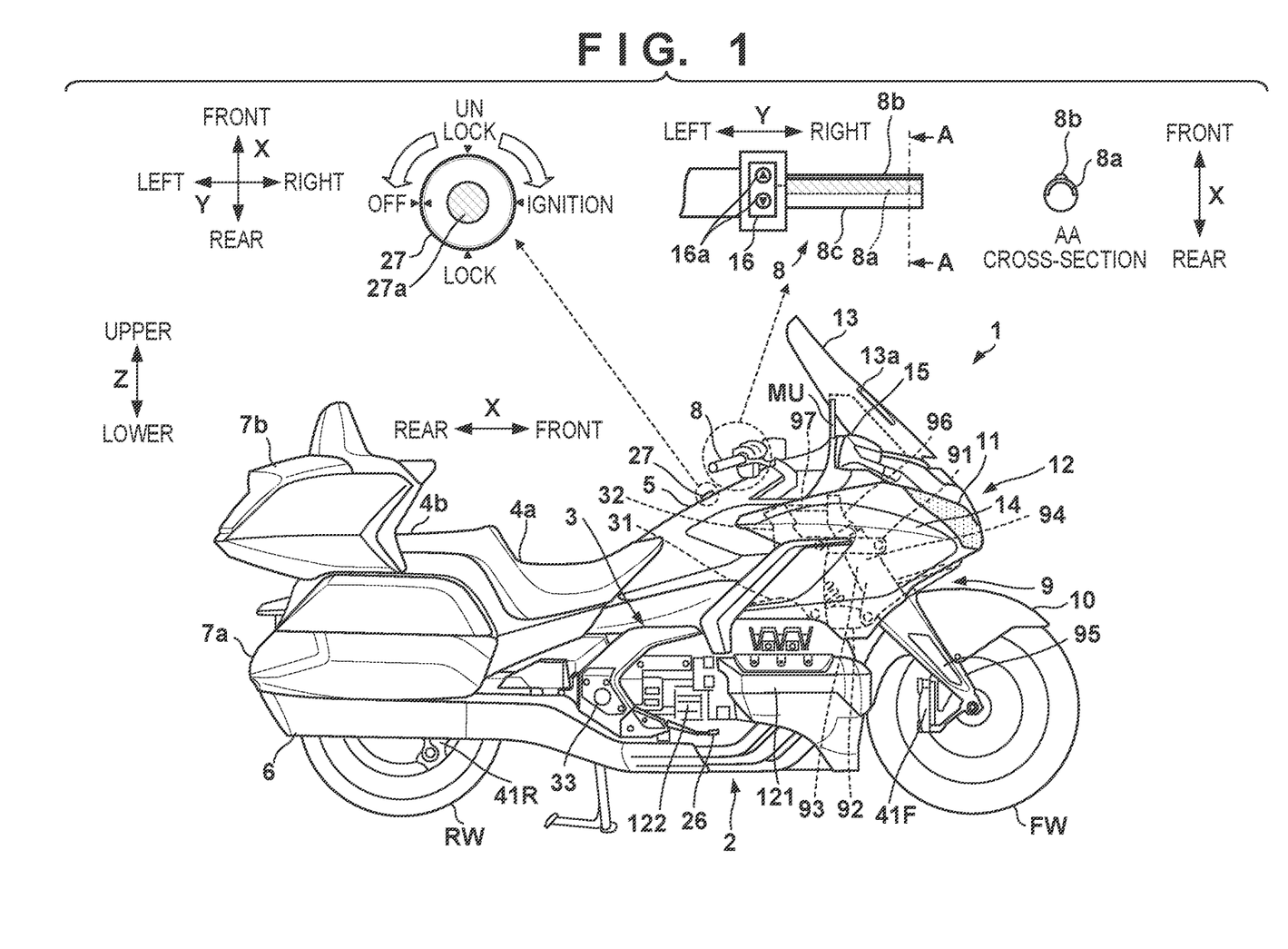
FIG. 1 shows a right side view and partial enlarged views of a straddle type vehicle according to an embodiment.

In FIG. 1, arrows X, Y, and Z indicate directions perpendicular to each other. The X direction indicates the front-and-rear direction of the motorcycle (straddle type vehicle), the Y direction indicates the vehicle width direction (left-and-right direction) of the straddle type vehicle, and the Z direction indicates the vertical direction. The front or rear in the front-and-rear direction of the straddle type vehicle will simply be called the front or rear in some cases.

<Outline of Straddle Type Vehicle>

FIG. 1 is a side view of the right side of a straddle type vehicle 1 according to the embodiment of the present invention. The straddle type vehicle 1 is a touring motorcycle suitable for long-distance traveling. However, the present invention is applicable to various kinds of straddle type vehicles including motorcycles of other forms. The present invention is also applicable to a vehicle including an internal-combustion engine as a driving source, and an electric vehicle including a motor as a driving source. In the following description, the straddle type vehicle 1 is also referred to as the vehicle 1.

The upper right portion of FIG. 1 is a partial enlarged view of a handle 8 of the vehicle 1, and the upper left portion of FIG. 1 is a partial enlarged view of a key operation unit 27 of the vehicle 1. The vehicle 1 includes a vehicle control apparatus 200 (FIG. 2) capable of being controlled by a brake-ty-wire method. A predetermined braking force is generated by a brake 220 in accordance with the brake-by-wire method under the control of a control unit 210 (FIG. 2) in accordance with an operation for allowing the driver (rider) to press a pressure sensitive portion 8a of a grip 8c and an operation for allowing the rider to operate a brake pedal which is a rear wheel brake operation unit 26.

The vehicle 1 includes a power unit 2 between a front wheel FW and a rear wheel RW. In this embodiment, the power unit 2 includes a flat-six engine 121 and a transmission 122. The driving force of the transmission 122 is transmitted to the rear wheel RW via a drive shaft (not shown) and rotates the rear wheel RW.

The power unit 2 is supported by a vehicle body frame 3. The vehicle body frame 3 includes a pair of left and right main frames 31 extended in the X direction. A fuel tank 5 and an air cleaner box (not shown) are arranged above the main frames 31. A meter unit MU for displaying various kinds of information to the occupant (rider) is installed before the fuel tank 5.

A head pipe 32 for pivotally supporting a steerable shaft (not shown) that is pivoted by a handle 8 is attached to the front end portions of the main frames 31. A pair of left and right pivot plates 33 are attached to the rear end portions of the main frames 31. The lower end portions of the pivot plates 33 and the front end portions of the main frames 31 are connected by a pair of left and right lower arms (not shown), and the power unit 2 is supported by the main frames 31 and the lower arms. In addition, a pair of left and right seat rails extending backward in the rear end portions of the main frames 31 are formed, and support, for example, a seat 4a on which the rider sits, a seat 4b on which a fellow passenger sits, and a rear trunk 7b.

The front end portion of a rear swing arm (not shown) extending in the front-and-rear direction is swingably supported by the pivot plates 33. The rear swing arm is vertically swingable, and its rear end portion supports the rear wheel RW. An exhaust muffler 6 for silencing the exhaust gas of the engine 121 extends in the X direction in the lower side portion of the rear wheel RW. Left and right saddlebags 7a are formed on the upper side portions of the rear wheel RW.

A front suspension mechanism 9 for swingably supporting the front wheel FW is formed in the front end portions of the main frames 31. The front suspension mechanism 9 includes an upper link 91, a lower link 92, a fork support member 93, a cushion unit 94, and a pair of left and right front forks 95. In the front suspension mechanism 9, the upper link 91, the lower link 92, the fork support member 93, and the cushion unit 94 form a support mechanism for supporting the front forks 95 of the vehicle 1.

The upper link 91 and the lower link 92 are arranged to be vertically arranged in the front end portions of the main frames 31. The rear end portions of the upper link 91 and the lower link 92 are swingably connected to the front end portions of the main frames 31. The upper link 91 and the lower link 92 are swingably connected to the fork support member 93. The cushion unit 94 has a structure in which a shock absorber is inserted into a coil spring, and its upper end portion is swingably supported by the main frames 31. The lower end portion of the cushion unit 94 is swingably supported by the lower link 92.

The fork support member 93 is cylindrical and inclines backward. The fork support member 93 supports a steering shaft 96 so that it is rotatable around its axis. The steering shaft 96 has a shaft portion (not shown) inserted into the fork support member 93. A bridge (not shown) is formed in the lower end portion of the steering shaft 96, and supports the pair of left and right front forks 95. The front forks 95 rotatably support the front wheel FW. The upper end portion of the steering shaft 96 is connected to the steerable shaft (not shown) that is pivoted by the handle 8, via a link 97. When the handle 8 is steered, the steering shaft 96 rotates and steers the front wheel FW. The upper portion of the front wheel FW is covered with a fender 10, and the fender 10 is supported by the front forks 95.

A headlight unit 11 for emitting light toward the front of the vehicle 1 is arranged at the front portion of the vehicle 1. A plurality of sets each including a light source serving as a light-emitting element such as an LED and a reflector are arranged in the headlight unit 11. The front side of the vehicle 1 is covered with a front cover 12, and the side portions of the front side of the vehicle 1 are covered with a pair of left and right side covers 14. A screen 13 supported by a screen stay 13a is arranged above the front cover 12. The screen 13 is a windshield for reducing the wind pressure received by the rider during traveling. A pair of left and right side mirror units 15 are arranged on the side portions of the front cover 12. A side mirror (not shown) is supported on each side mirror unit 15 so that the rider can visually check the rear side of the vehicle.

<Mechanism of Handle 8>

The pressure sensitive portion 8a (piezoelectric element) and the signal processing unit 16 for detecting the pressure applied to the grip 8c and outputting an electrical signal corresponding to the detected pressure to a signal processing unit 16 are arranged as a brake operation unit in place of the brake lever on the right handle 8 of the straddle type vehicle 1. The signal processing unit 16 supplies the power of a battery power supply 30 to the control unit 210 based on the electrical signal output from the pressure sensitive portion 8a.

As shown in the partial enlarged view of the periphery of the handle 8, the pressure sensitive portion 8a is arranged along the circumferential direction of the inner portion of the grip 8c. The detection range of the pressure sensitive portion 8a is a substantially half region (partial outer circumferential region) of the inner circumferential region of the grip 8c on the front side of the straddle type vehicle 1. A convex portion 8b is formed on part of the grip surface of the handle 8. The convex portion 8b is formed within the detection range of the pressure sensitive portion 8a.

When the detection range of the pressure sensitive portion 8a is formed in the partial outer circumferential region of the grip 8c on the rear side of the vehicle 1, the upper body of the driver (rider) who grips the grip 8c during traveling tends to lean, and the rider may press the pressure sensitive portion 8a of the grip 8c to actuate the brake in some cases. In order to prevent unintended brake actuation, in the arrangement of the vehicle 1 of this embodiment, the detection range of the pressure sensitive portion 8a is formed in the half partial outer circumferential region of the circumferential region of the inner side of the grip 8c on the front side of the vehicle 1. Note that in addition to the example of the partial enlarged view shown in FIG. 1, for example, in consideration of a state in which the grip 8c has been pivoted, the detection range of the pressure sensitive portion 8a may be set at a position on the front side of the vehicle 1 in the accelerator open state (the pivoted state of the grip 8c).

As shown in the partial enlarged view of FIG. 1, when the driver (rider) grips the grip 8c provided with the convex portion 8b, he/she can tactilely discriminate the pressure sensitive portion 8a. When the pressure sensitive portion 8a serving as the brake operation unit is integrally formed with the grip 8c, the brake operation can be smoothly shifted from the accelerator open state regardless of the size of the hand of the driver (rider), thereby providing the vehicle 1 excellent in the accelerator operation and brake operation.

The electrical signal output from the pressure sensitive portion 8a is amplified by a predetermined coefficient (gain coefficient) set in the signal processing unit 16 and input to the control unit (ECU) 210. The signal processing unit 16 includes a coefficient setting unit 16a for setting the coefficient for amplifying the electrical signal output from the pressure sensitive portion 8a. When the setting in the coefficient setting unit 16a is changed, a gain coefficient G for amplifying the electrical signal of the pressure sensitive portion 8a can be changed. An arbitrary coefficient larger than 1 can be set as the gain coefficient G. For example, if the coefficient setting unit 16a sets 2 as the gain coefficient, the signal processing unit 16 can generate a signal obtained by doubling the electrical signal of the pressure sensitive portion 8a and inputs the amplified signal to the control unit 210 of the vehicle control apparatus 200. The signal obtained by doubling the electrical signal corresponds to an electrical signal output from the pressure sensitive portion 8a when a 2× pressure is applied to the pressure sensitive portion 8a. The control unit 210 of the vehicle control apparatus 200 controls the brake 220 to generate a braking force based on the signal multiplied by the gain coefficient.

The gain coefficient can be set variable to adjust the brake effect to match the grip strength of the driver (rider). Accordingly, even a driver (rider) who has a small physique and a weak grip strength can obtain a predetermined brake effect while reducing the physical load.

<Basic Arrangement of Vehicle Control Apparatus>

Figure 2:
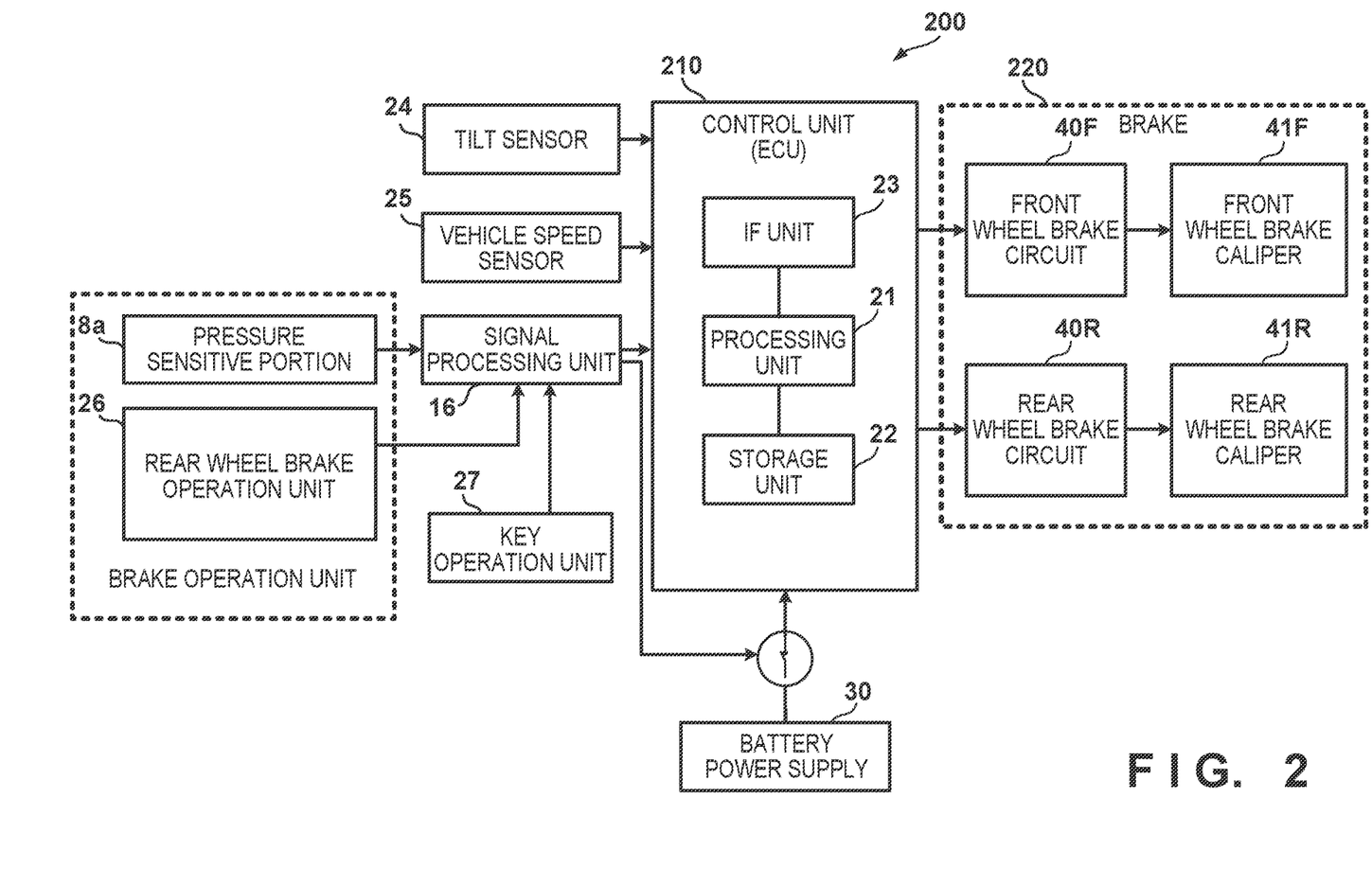
FIG. 2 is a block diagram showing the arrangement of a vehicle control apparatus according to the embodiment.

The arrangement of the vehicle control apparatus 200 mounted in the vehicle 1 of the embodiment of the present invention will be described with reference to the drawing. FIG. 2 is a block diagram showing the arrangement of the vehicle control apparatus 200 of the vehicle 1.

The control unit 210 is formed by an electronic control unit (ECU) including a processing unit 21 formed by a processor such as a CPU, a storage unit 22 configured to store the calculation processing result of the processing unit 21, and an interface unit 23 (I/F unit). The interface unit 23 (I/F unit) exchanges signals with external devices including a tilt sensor 24, a vehicle speed sensor 25, the signal processing unit 16, the key operation unit 27, a front wheel brake circuit 40F, and a rear wheel brake circuit 40R. The control unit 210 can be mounted at any position of the vehicle 1 and may be formed by a plurality of mutually communicable electron control units.

The pressure sensitive portion 8a functions as a front wheel brake operation unit. The arrangement as the combination of the rear wheel brake operation unit 26 and the front wheel brake operation unit (the pressure sensitive portion 8a) is given as the brake operation unit in FIG. 2. The control unit 210 controls the brake 220 of the straddle type vehicle 1 based on a signal from the signal processing unit 16. The signal processing unit 16 supplies the power of the battery power supply 30 to the control unit 210 by the predetermined input operation in the handle locking state of the straddle type vehicle 1.

The predetermined input operation here includes an operation for the key operation unit 27 for releasing the handle locking state. Handle locking is electronically controlled by the brake-by-wire method. The signal processing unit 16 supplies the power of the battery power supply 30 to the control unit 210 based on the signal input from the key operation unit 27 in accordance with the operation to the key operation unit 27. The control unit 210 activated based on the battery power supply 30 controls the brake 220 before the handle locking state is released.

In addition, the predetermined input operation includes an operation to the brake operation unit (the pressure sensitive portion 8a and the rear wheel brake operation unit 26). The signal processing unit 16 supplies the power of the battery power supply 30 to the control unit 210 based on the signal input from the brake operation unit in accordance with the above operation. The control unit 210 activated based on the battery power supply controls the brake 220 before the handle locking state is released.

Upon reception of the power from the battery power supply 30, the control unit 210 can drive and control a front wheel brake caliper (front wheel brake) 41F and a rear wheel brake caliper (rear wheel brake) 41R to apply a predetermined braking force to the vehicle 1.

The control unit 210 generates control signals for controlling the front wheel brake circuit 40F and the rear wheel brake circuit 40R in accordance with the operation for allowing the driver (rider) to press the pressure sensitive portion 8a of the grip 8c and the operation for the brake pedal serving as the rear wheel brake operation unit 26.

Each of the front wheel brake circuit 40F and the rear wheel brake circuit 40R includes a hydraulic circuit (not shown) made of a regulator, an electromagnetic valve, or the like. Based on the control signals, each of the operations of the front wheel brake caliper 41F and the rear wheel brake caliper 41R is controlled in accordance with a predetermined control pressure generated from the hydraulic pressure of the working oil in the master cylinder. Each of the front wheel brake caliper 41F and the rear wheel brake caliper 41R generates the predetermined braking force based on the generated control pressure.

As shown in FIG. 2, in the vehicle control apparatus 200, the front wheel brake circuit 40F and the rear wheel brake circuit 40R which are independent of each other are synchronized by the control unit 210. For example, when the brake operation is performed for one of the front wheel side and the rear wheel side, the brakes (the front wheel brake caliper 41F and the rear wheel brake caliper 41R) of the front wheel and the rear wheel can be synchronized to perform the braking operation.

For example, when the pressure sensitive portion 8a is pressed and operated, the front wheel brake circuit 40F generates the predetermined control pressure based on the hydraulic pressure of the working oil of the front wheel master cylinder under control of the control unit 210 in accordance with the brake-by-wire method. The predetermined control pressure is applied to the front wheel brake caliper 41F. In the rear wheel brake circuit 40R, the predetermined control pressure is generated under the control of the control unit 210 and applied to the rear wheel brake caliper 41R.

The control unit 210 supplies the control pressures for controlling the brakes to the front wheel brake caliper 41F and the rear wheel brake caliper 41R in accordance with the operation of the pressure sensitive portion 8a functioning as the front wheel brake operation unit and the operation of the brake pedal serving as the rear wheel brake operation unit 26. In addition, the control unit 210 can independently or synchronously control the braking forces of the front wheel and the rear wheel based on various kinds of sensor information.

The vehicle speed sensor 25 shown in FIG. 2 detects the vehicle wheel speed of the vehicle 1. The control unit 210 sets a higher vehicle wheel speed of the vehicle wheel speeds of the vehicle 1 detected by the front wheel vehicle speed sensor 25 and the rear wheel vehicle speed sensor 25 as an estimated vehicle speed of the vehicle. The control unit 210 then calculates a slip ratio (for example, front wheel slip ratio or rear wheel slip ratio) based on a difference between the estimated vehicle speed and one of the front and rear vehicle wheel speeds. If the calculated front wheel slip ratio and the calculated rear wheel slip ratio exceed threshold slip ratios, the processing unit 21 determines that the slip has occurred in the vehicle wheel. The control unit 210 can start ABS control for reducing the control pressure in the front wheel brake circuit 40F or the rear wheel brake circuit 40R.

The tilt sensor 24 shown in FIG. 2 detects a tilt angle (climbing angle) of the vehicle 1 in the pitching direction. The processing unit 21 can determines based on tilt angle information detected by the tilt sensor 24 that the state of the vehicle 1 is in a tilt state. For example, if the tilt angle is equal to or more than a threshold based on comparison between the tilt angle in the traveling or stop state and a reference angle (threshold), the processing unit 21 determines that the vehicle 1 is in a tilt state. If the tilt angle is equal to or more than the threshold based on the comparison between the tilt angle and the threshold, the control unit 210 determines that the straddle type vehicle 1 is in the tilt state. The control unit 210 controls the brake 220. If the tilt angle is less than the threshold, the control unit 210 determines that the straddle type vehicle 1 is not in the tilt state (for example, the state in which the vehicle is stopped on the flat road surface). The control unit 210 controls the brake 220 at the first timing. If the vehicle is in the tilt state, the control unit 210 controls the brake 220 at the second timing earlier than the first timing.

Note that the threshold can be set by a plurality of thresholds, for example, the first threshold (small), the second threshold (medium), and the third threshold (large). In this case, the control unit 210 can determine the degrees of the tilt states stepwise such as the first tilt state (low), the second tilt state (medium), and the third tilt state (high) by comparison between the plurality of thresholds and the tilt angle detected by the tilt sensor 24. Note that the setting of the first threshold to the third threshold, and the degrees of the tilt state corresponding to the threshold (the first tilt state to the third tilt state) are merely examples. The thresholds and the tilt degrees can be set in a multistage manner. In this case, the control unit 210 controls the brake 220 at a timing earlier than the first timing if the degree of the tilt state is higher.

If the processing unit 21 determines based on the detection value of the vehicle speed sensor 25 that the vehicle 1 is in the stop state (the state in which the detection value of the vehicle speed sensor 25 is zero), the processing unit 21 stores the detection result of the tilt state in the storage unit 22 made of a nonvolatile memory. If the vehicle 1 is in the tilt state, that is, if the vehicle 1 is stopped on a road surface in the tilt state (slope), the processing unit 21 stores, for example. "1" as the identification information in the storage unit 22. If the vehicle 1 is not in the tilt state, that is, if the vehicle 1 is stopped on a flat road surface which is not the slope, the processing unit 21 stores, for example, "0" as the identification information in the storage unit 22.

If the degree of the tilt state is determined stepwise, for example, identification information "1A" corresponding to the first tilt state (low), identification information "1B" corresponding to the second tilt state (medium), and identification information "1C" corresponding to the third tilt state (high) are stored as the pieces of identification of the tilt states in the storage unit 22.

Figure 6:
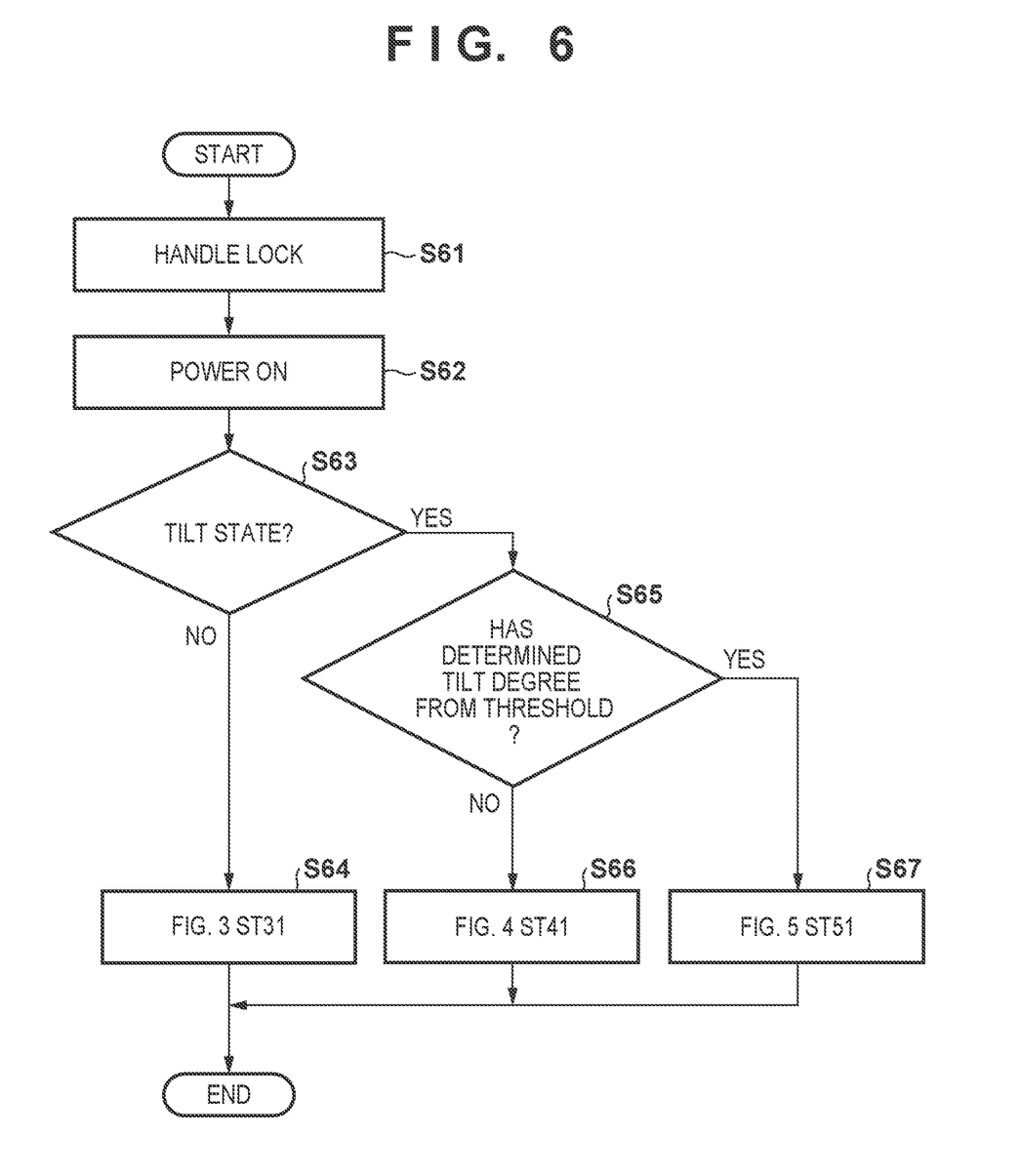
FIG. 6 is a flowchart for explaining the procedure of processing of the vehicle control apparatus of the embodiment.

FIG. 6 is a flowchart for explaining the procedure of processing of the control unit 210 according to the embodiment. The processing unit 21 of the control unit 210 refers to the identification information stored in the storage unit 22 to determine whether the vehicle 1 is in a tilt state. In addition, if the vehicle 1 is in a tilt state, the processing unit 21 can change the timing for operating the brake 220 by the power from the battery power supply 30. In addition, if the processing unit 21 determines the degree of the tilt state by the threshold, the timing at which the brake 220 is operated can be changed stepwise in accordance with the degree of the tilt state.

In step S61, the vehicle 1 is set in the handle locking state by the operation of the key operation unit 27. In step S62, the signal processing unit 16 supplies the power of the battery power supply 30 to the control unit 210 (power ON) based on the signal input from the brake operation unit upon operation of the brake operation unit (the pressure sensitive portion 8a and the rear wheel brake operation unit 26) of the straddle type vehicle. The signal processing unit 16 sets an electrical energization enable state between the battery power supply 30 and the control unit 210 based on the signal input from the brake operation unit. The battery power supply 30 starts to supply the power to the control unit 210.

In step S63, the processing unit 21 of the control unit 210 refers to the identification information stored in the storage unit 22 to determine whether the vehicle 1 in the stop state is in the tilt state. If the vehicle 1 in the stop state is not in the tilt state (NO in step S63), that is, if the vehicle 1 is in the stop state on the flat road surface, the processing unit 21 advances the process to step S64. In this case, the control unit 210 controls the brake 220 to generate the braking force by the brake-by-wire method before the release of the handle locking state in accordance with the timing chart of ST31 in FIG. 3.

On the other hand, if the vehicle 1 in the stop state is in the tilt state in the determination in step S63 (YES in step S63), the processing unit 21 advances the process to step S65.

In step S65, the processing unit 21 refers to the storage unit 22 to determine the degree of the tilt state stepwise using the threshold. If it is not determined that the degree of the tilt state is not determined stepwise by the threshold (No in step S65), the processing unit 21 advances the process to step S66. The processing unit 21 of the control unit 210 controls the brake 220 to generate the braking force by the brake-by-wire method before the release of the handle locking state in accordance with the timing chart in ST41 of FIG. 4.

On the other hand, in the determination of step S65, if the degree of the tilt state is determined stepwise (YES in step S65), the processing unit 21 advances the process to step S67. The processing unit 21 of the control unit 210 controls the brake 220 to generate the braking force by the brake-by-wire method before the release of the handle locking state in accordance with the timing chart of ST51 in FIG. 5. The contents of the timing chart will be described below.

<State of Vehicle 1 not in Tilt State: S64>

Figure 3:
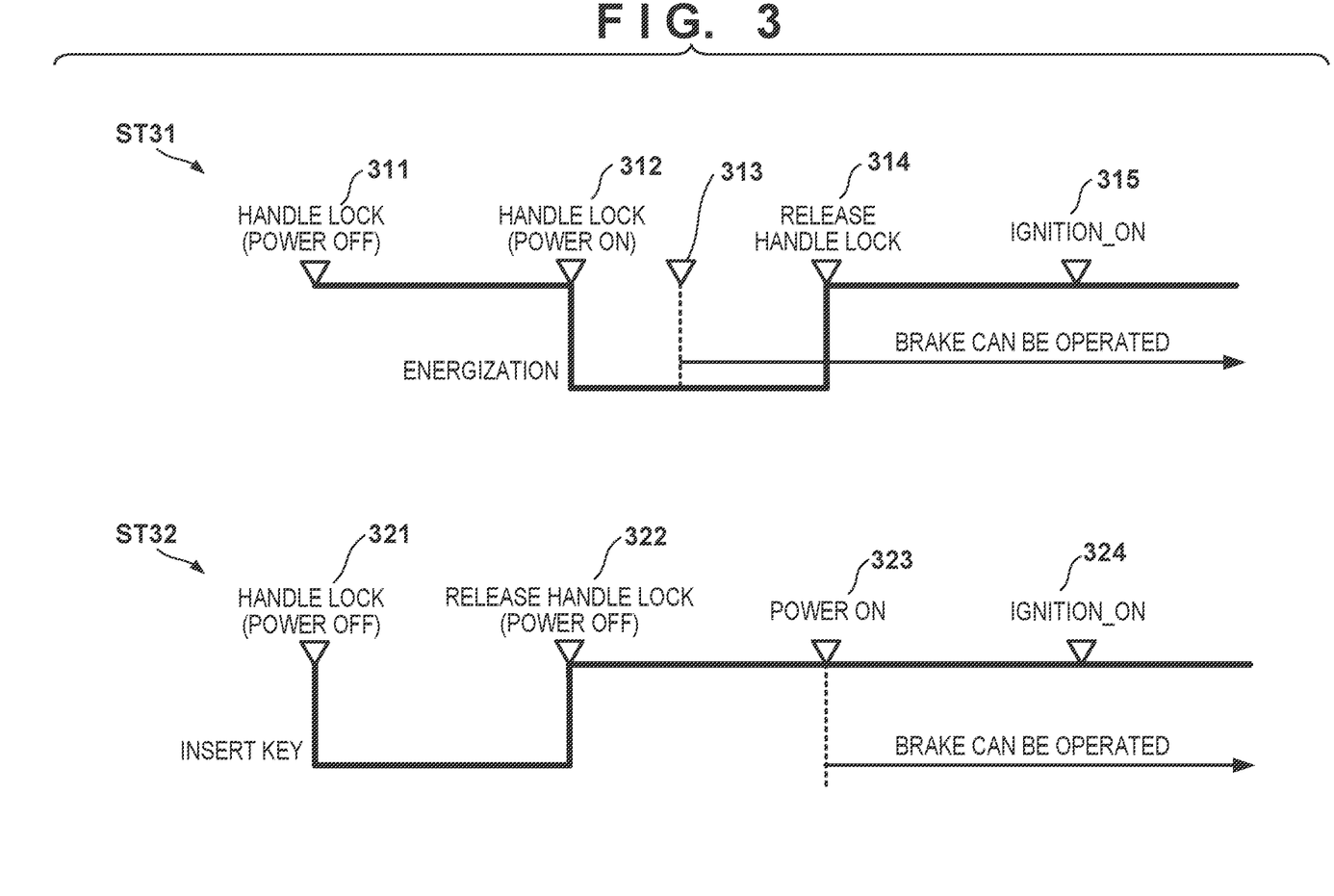
FIG. 3 is a timing chart showing a handle locking setting/release timing and a power supply ON timing according to the embodiment.

ST31 in FIG. 3 is a timing chart showing the handle locking setting/release timing and the power ON timing if the state of the vehicle 1 in the stop state is not in the tilt state. ST32 is the timing chart of the handle locking setting/release timing and the power ON timing in the conventional system as a comparative example.

The key operation unit 27 is arranged in the vehicle 1 to allow handle locking setting for restricting steering of the handle 8. The key operation unit 27 is, for example, a switch shown in the enlarged view of FIG. 1. The operation of the key operation unit 27 allows the stop of power from the battery power supply 30 (power OFF), handle locking setting (locking: LOCK), release (unlocking: UNLOCK), the start of power supply from the battery power supply 30 (power ON), and the start of the engine (IGNITION_ON). Note that the arrangement of the key operation unit 27 is merely an example, and can be an arrangement in which a key is inserted into a physical key cylinder.

When setting handle locking, for example, the key operation unit 27 is rotated counterclockwise to set the key operation unit 27 to the power OFF position (power supply of the battery power supply 30 is set OFF). In this state, the handle 8 is pivoted left or right and set in this position. The key operation unit 27 is rotated from the power OFF position to the locking (LOCK) position, thereby setting the handle locking state (311 of ST31).

In the handle locking state, the signal processing unit 16 supplies the power of the battery power supply 30 to the control unit 210 based on the signal input from the brake operation unit (power ON) when the brake operation unit (the pressure sensitive portion 8a and the rear wheel brake operation unit 26) of the straddle type vehicle 1 is operated. The signal processing unit 16 sets an electrical energization enable state between the battery power supply 30 and the control unit 210 based on the signal input from the brake operation unit. The battery power supply 30 supplies the power to the control unit 210 (312 of ST31). The processing unit 21 of the control unit 210 sets the brake 220 in an operable state by the brake-by-wire method (313 of ST31). In this state, the braking force is generated in the brake 220 by the brake-by-wire method before the release of the handle locking state. Note that in addition to this example, in the handle locking state, an energization button 27a of the key operation unit 27 can be pressed to set an electrical energization enable state between the battery power supply 30 and the control unit 210 to supply the power of the battery power supply 30 to the control unit 210.

When releasing the handle locking state, the key operation unit 27 is rotated counterclockwise from the locking (LOCK) position to set the key operation unit 27 to the unlocking (UNLOCK) position, thereby releasing the handle locking state based on the power of the battery power supply 30 (314 of ST31). In addition, the key operation unit 27 is rotated clockwise to set the key operation unit 27 to the ignition (IGNITION_ON) position, thereby starting the engine (315 of ST31).

On the other hand, in ST32 of the comparative example, in the handle locking state (321 of ST32), even in a state in which the key is kept inserted into the physical key cylinder, the power OFF is set. In addition, even in a state in which the handle locking state is released by the operation of the handle 8, the power OFF is set (322 of ST32). The power supply is set in the power ON state by the key operation after the release of the handle locking state (323 of ST32), and IGNITION_ON is set, thereby starting the engine (324 of ST32).

In the vehicle control apparatus 200 of this embodiment (ST31), the brake 220 is operable before the release of the handle locking state. On the other hand, in the comparative example, since the power ON timing is set after the release of the handle locking state, the brake operable state timing is delayed as compared with the case of ST31.

According to the arrangement of this embodiment, the control unit 210 activated based on the battery power supply can control the brake 220 before the release of the handle locking state of the straddle type vehicle 1. That is, the braking force can be generated by the brake-by-wire method before the release of the handle locking state.

<State of Vehicle 1 in Tilt State: S66>

Figure 4:
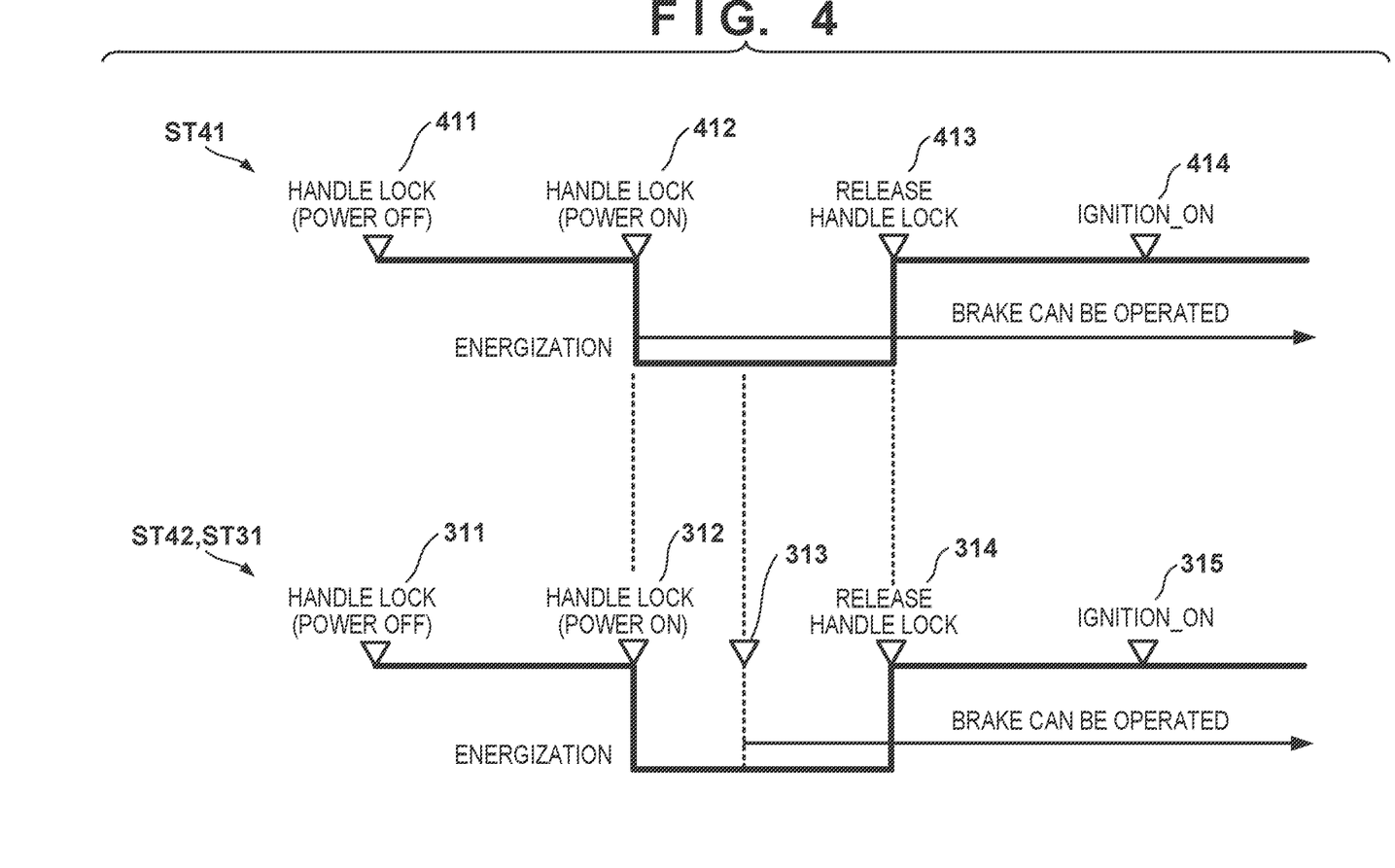
FIG. 4 is a timing chart showing a handle locking setting/release timing and a power supply ON timing in the brake control system of the embodiment.

FIG. 4 shows the handle locking setting/release timing and the power ON timing in the vehicle control apparatus 200 of this embodiment. ST41 is a timing chart when the vehicle 1 is stopped on the road surface in the tilt state (slope). ST42 is a timing chart of the handle locking setting/release timing and the power ON timing described in ST31 of FIG. 3 and shows the timing chart in a state in which the vehicle 1 is stopped on the flat road surface which is not the slope.

The processing unit 21 of the control unit 210 refers to the identification information stored in the storage unit 22 to determine whether the vehicle 1 is set in a tilt state. If the vehicle 1 is determined to be set in the tilt state, the processing unit 21 selects ST41 as the operation control timing chart of the brake 220. On the other hand, if it is determined that the vehicle 1 is not in the tilt state (the vehicle is stopped on the flat road surface), the processing unit 21 selects ST31 described with reference to FIG. 3 as the operation control timing chart of the brake 220. Control of the brake 220 by the processing unit 21 when ST31 is selected as the timing chart is the same as the processing described above with reference to FIG. 3.

In the timing chart of ST41, when setting the handle locking state, the key operation unit 27 is rotated counterclockwise to set the key operation unit 27 to the power OFF (the power from the battery power supply 30 is stopped) position. In this state, the handle 8 is pivoted left or right. When the key operation unit 27 is rotated from the power OFF position to the locking (LOCK) position to set the handle locking state (411 of ST41).

In the handle locking state, the signal processing unit 16 supplies the power of the battery power supply 30 to the control unit 210 based on the signal input from the brake operation unit (power ON) when the brake operation unit (the pressure sensitive portion 8a and the rear wheel brake operation unit 26) of the straddle type vehicle 1 is operated. The signal processing unit 16 sets an electrical energization enable state between the battery power supply 30 and the control unit 210 based on the signal input from the brake operation unit. The battery power supply 30 starts to supply the power to the control unit 210. The processing unit 21 of the control unit 210 sets the brake 220 in an operable state by the brake-by-wire method (412 of ST41).

In this state, the braking force is generated in the brake by the brake-by-wire method before the release of the handle locking state. When the vehicle 1 is set in the tilt state, the processing unit 21 of the control unit 210 generates the braking force in the brake 220 by the brake-by-wire method at the second timing (412 of ST41) earlier than the first timing (313 of ST31) for generating the braking force in the brake 220 in ST31.

When releasing the handle locking state, the key operation unit 27 is rotated counterclockwise from the locking (LOCK) position to set the key operation unit 27 to the unlocking (UNLOCK) position, thereby releasing the handle locking state based on the power of the battery power supply 30 (413 of ST41). In addition, the key operation unit 27 is rotated clockwise to set the key operation unit 27 to the ignition (IGNITION_ON) position, thereby starting the engine (414 of ST41).

According to the arrangement of this embodiment, the control unit 210 activated based on the battery power supply can control the brake 220 before the release of the handle locking state of the straddle type vehicle 1. As compared with the case in which the vehicle 1 is stopped on the flat road surface, when the vehicle is stopped on the tilt road surface, the braking force can be generated by the brake-by-wire method at an earlier timing. For example, assuming that the vehicle is stopped on a slope, when the driver slightly moves the two-wheeled vehicle, the driver can operate the brake, and the load on the driver by the weight of the vehicle can be reduced.

<Stepwise Determination of Degree of Tilt State: S67>

When the vehicle 1 is stopped on the road surface in the tilt state (slope), the processing unit 21 determines the degree of the tilt state stepwise based on the plurality of set thresholds (for example, the first threshold to the third threshold), and the determination result can be stored in the storage unit 22. For example, the processing unit 21 stores the identification information "1A" corresponding to the first tilt state (low), the identification information "1B" corresponding to the second tilt state (medium), and the identification information "1C" corresponding to the third tilt state (high) in the storage unit 22.

Figure 5:
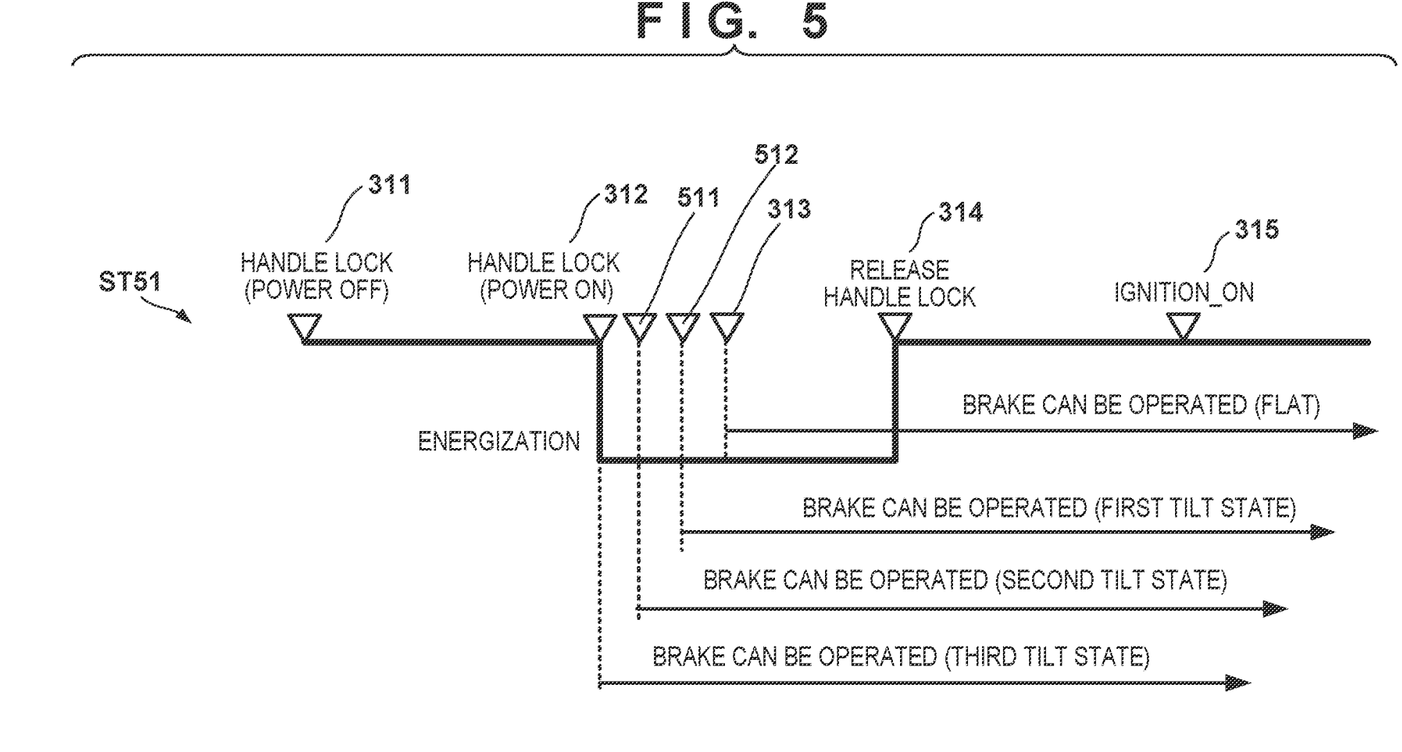
FIG. 5 is a view for explaining changes in timings capable of actuating the brake based on degrees of tilt states.

The processing unit 21 refers to the identification information stored in the storage unit 22 to determine the degree of the tilt state of the vehicle 1 which is stopped. Based on the degree of the tilt state of the vehicle 1, the processing unit 21 changes the timing at which the brake 220 can be operated by power from the battery power supply 30. FIG. 5 is a view for changing the timing capable of operating the brake 220 based on the degree of the tilt state. Of the timings shown in FIG. 5, 311 to 315 are similar to the timings described with reference to FIG. 3.

As shown in FIG. 5, if the vehicle 1 is set in the first tilt state (low), the processing unit 21 of the control unit 210 generates the braking force in the brake 220 by the brake-by-wire method at a timing (512 of ST51) earlier than the timing (313 of ST51: the vehicle 1 is stopped on the flat road surface) for generating the braking force in the brake 220 in ST51.

If the vehicle 1 is set in the second tilt state (medium), the processing unit 21 of the control unit 210 generates the braking force in the brake 220 by the brake-by-wire method at a timing (511 of ST51) earlier than the timing (512 of ST51) for generating the braking force in the brake 220 in ST51.

If the vehicle 1 is set in the third tilt state (high), the processing unit 21 of the control unit 210 generates the braking force in the brake 220 by the brake-by-wire method at a timing (312 of ST51) earlier than the timing (511 of ST51) for generating the braking force in the brake 220 in ST51.

With the arrangement of this embodiment, the control unit 210 activated based on the battery power supply can control the brake 220 before the release of the handle locking state of the straddle type vehicle 1. As compared with the case in which the vehicle is stopped on the flat road surface, when the vehicle is stopped on the tilt road surface, the braking force can be generated by the brake-by-wire method at an earlier timing in accordance with the degree of the tilt state. Accordingly, even if the two-wheeled vehicle is slightly moved in the tilt state, as compared with the case in which the vehicle is stopped in the flat state, the driver can operate the brake 220 at an earlier timing. The load based on the weight of the vehicle can be reduced. Note that although the processing at the time of operating the brake operation unit has been described as an example of the input operation in FIG. 3 (ST31), FIG. 4 (ST41), and FIG. 5 (ST51), processing at the time of operation of the key operation unit 27 to release the handle locking state can be similarly performed in addition to the example described above.

Other Embodiments

A vehicle control program configured to implement one or more functions described in the embodiment is supplied to a system or a device via a network or a storage medium, and one or more processors in the computer of the system of the device can read out and execute the program. The present invention can also be implemented by such a form.

Summary of Embodiment

The embodiment discloses at least the following arrangements.

Arrangement 1. There is provided a straddle type vehicle (for example, 1 in FIG. 1) including a vehicle control apparatus (for example, 200 in FIG. 2) capable of controlling a brake (for example, 220 in FIG. 2) by a brake-by-wire method, comprising:
  a control unit (for example, 210 in FIG. 2) configured to control the brake (220) of the straddle type vehicle (1) based on a signal from a brake operation unit (for example, 8a, 26 in FIG. 2); and
  a signal processing unit (for example, 16 in FIG. 1) configured to supply power of a battery power supply (for example, 30 in FIG. 2) of the straddle type vehicle (1) to the control unit (210) by a predetermined input operation in a handle locking state of the straddle type vehicle (1).

According to the straddle type vehicle of Arrangement 1, there can be provided a straddle type vehicle capable of supplying the power of the battery power supply of the straddle type vehicle to the control unit by the predetermined input operation in the handle locking state.

Arrangement 2. In the vehicle according to the above embodiment, the input operation includes an operation to an operation unit (for example, 27 in FIG. 1) configured to release the handle locking state.

According to the straddle type vehicle of Arrangement 2, by supplying power to the control unit in synchronism with the operation for releasing the handle locking state, the brake operation can be quickly performed after the operation for releasing the handle locking state without requiring any other operation.

Arrangement 3. In the vehicle according to the above embodiment, the handle locking state is electronically controlled by the brake-by-wire method, and based on a signal input from the operation unit (27) by the operation, the signal processing unit (16) supplies the power of the battery power supply (30) to the control unit (210), and the control unit (210) activated based on the battery power supply (30) controls the brake (220) before release of the handle locking state.

According to the straddle type vehicle of Arrangement 3, the handle locking state can be released after the brake can be controlled. This makes it possible to reliably operate the brake.

Arrangement 4. In the vehicle according to the above embodiment, the input operation includes an operation to the brake operation unit (8a, 26), and based on a signal input from the brake operation unit (8a, 26) by the operation, the signal processing unit (16) supplies the power of the battery power supply (30) to the control unit (210), and the control unit (210) activated based on the battery power supply (30) controls the brake (220) before release of the handle locking state.

According to the straddle type vehicle of Arrangement 4, the brake can be controlled by the brake-by-wire method before the release of the handle locking state. This makes it possible to reliably operate the brake.

Arrangement 5. The vehicle according to the above embodiment further comprises a detection unit (for example, 24 in FIG. 2) configured to detect a tilt angle of the straddle type vehicle (1) in a pitching direction, wherein if the tilt angle is not less than a threshold based on comparison between the tilt angle and the threshold, the control unit (210) determines that the straddle type vehicle (1) is in a tilt state and controls the brake (220).

According to the straddle type vehicle of Arrangement 5, if it is determined that the straddle type vehicle is in the tilt state, the brake can be controlled before the release of the handle locking state of the straddle type vehicle. In addition, the braking force can be generated by the brake-by-wire method before the release of the handle locking state. For example, assuming that the vehicle is stopped on the slope, even if the two-wheeled vehicle is slightly moved, the driver can operate the brake, and the load based on the weight of the vehicle can be reduced.

Arrangement 6. In the vehicle according to the above embodiment, if the tilt angle is less than the threshold, the control unit (210) determines that the straddle type vehicle (1) is not in the tilt state and controls the brake (220) at a first timing (for example, ST31 in FIG. 3), and if the control unit (210) determines that the vehicle (1) is in the tilt state, the control unit (210) controls the brake (220) at a second timing (for example, ST41 in FIG. 4) earlier than the first timing (for example, ST31 in FIG. 3).

According to the straddle type vehicle of Arrangement 6, the brake can be controlled before the release of the handle locking state of the straddle type vehicle. In addition, as compared with the case in which the straddle type vehicle is stopped on the flat road surface, when the vehicle is stopped on the tilt state, the braking force can be generated by the brake-by-wire method at an earlier timing.

Arrangement 7. In the vehicle according to the above embodiment, the control unit (210) controls the brake at a timing earlier than the first timing as a degree of the tilt state is higher (for example, ST51 in FIG. 5).

According to the straddle type vehicle of Arrangement 7, the brake can be controlled before the release of the handle type vehicle. In addition, as compared with the case in which the vehicle is stopped on the flat road surface, when the vehicle is stopped on the tilt road surface, the braking force can be generated by the brake-by-wire method at an earlier timing in accordance with the degree of the tilt state. Accordingly, even if the driver slightly moves the vehicle in the tilt state, the driver can operate the brake at an earlier timing as compared with the case in which the vehicle is stopped in the flat state. This makes it possible to reduce the load based on the weight of the vehicle.

Arrangement 8. In the vehicle according to the above embodiment, the signal processing unit (16) supplies the power of the battery power supply (30) to the control unit (210) based on a signal input at the time of an operation of the brake operation unit (8a).

According to the straddle type vehicle of Arrangement 8, the electrical energization enable state is set between the battery power supply and the control unit based on the signal input at the time of operating the brake. This makes it possible to activate the control unit based on the battery power supply. There is no need to set the battery power supply in the energization enable state. While the energy saving of the battery power supply is enhanced, the control unit can control the brake at the timing which requires the brake.

Arrangement 9. In the vehicle according to the above embodiment, a pressure sensitive unit (for example, 8a in FIG. 1) configured to detect an applied pressure and outputting a signal corresponding to the detected pressure to the signal processing unit (16) is arranged as the brake operation unit on a grip (for example, 8c in FIG. 1) of a handle of the straddle type vehicle, and the signal processing unit (16) supplies the power of the battery power supply (30) to the control unit (210) based on the signal output from the pressure sensitive unit (8a).

According to the straddle type vehicle according to Arrangement 9, the battery power supply need not be set in the energization enable state. While the energy saving of the battery power supply can be enhanced, the brake can be controlled at the timing which requires the brake.

In addition, since the pressure sensitive unit serving as the brake operation unit is integrally formed with the grip, the operation can be smoothly shifted to the brake operation from the accelerator open state regardless of the size of the hand of the driver (rider). There can be provided the straddle type vehicle excellent in the accelerator operation and the brake operation.

Arrangement 10. In the vehicle according to the above embodiment, the pressure sensitive unit (8a) is arranged in an inner circumferential direction of the grip (8c), and a detection range of the pressure sensitive unit (8a) is formed in a half region of a region of the grip (8c) in the inner circumferential direction on a front side of the straddle type vehicle (1).

According to the straddle type vehicle of Arrangement 10, the upper body of the driver (rider) who grips the grip in the traveling state leans against the grip and the grip is pressed. Such an intended brake operation error which erroneously operate the brake can be prevented.

Arrangement 11. In the vehicle according to the above embodiment, a convex portion (for example, 8b in FIG. 1) is formed in part of a surface of the grip (8) of the handle, and the convex portion (8b) is formed within the detection range of the pressure sensitive unit (8a).

According to the straddle type vehicle of Arrangement 11, when the driver (rider) grips the grip with the convey portion, the driver can tactilely discriminate the detection region formed in the sensitive unit.

Arrangement 12. In the vehicle according to the above embodiment, the signal processing unit (16) comprises a coefficient setting unit (for example, 16*a* in FIG. 1) configured to set a coefficient for amplifying an electrical signal output from the pressure sensitive unit (8*a*), the signal processing unit (16) inputs, to the control unit (210), a signal multiplied by the coefficient set by the coefficient setting unit (16*a*), and the control unit (210) controls the brake (220) so that a braking force based on the signal is generated.

According to the straddle type vehicle of Arrangement 12, since the coefficient (gain coefficient) can be set variable, the brake effect can be adjusted to match the grip strength of the driver (rider). Even for a driver (rider) who has a small physique and a weak grip strength, the physical load can be reduced, and the predetermined brake effect can be implemented.

Arrangement 13. There is provided a vehicle control apparatus (for example, 200 in FIG. 2) capable of controlling a brake (for example, 220 in FIG. 2) of a vehicle (for example, 1 in FIG. 1) by a brake-by-wire method, comprising:

a control unit (for example, 210 in FIG. 2) configured to control the brake of the vehicle based on a signal from a brake operation unit (for example, 8*a*, 16, 26 in FIG. 2); and a signal processing unit (for example, 16 in FIG. 2) configured to supply power of a battery power supply (for example, 30 in FIG. 2) of the vehicle to the control unit by a predetermined input operation in a handle locking state of the vehicle (1).

According to the straddle type vehicle of Arrangement 13, there can be provided a straddle type vehicle capable of supplying the power of the battery power supply of the straddle type vehicle to the control unit by the predetermined input operation in the handle locking state.

Arrangement 14. There is provided a vehicle control method in a vehicle control apparatus (for example, 200 in FIG. 2) including a control unit (for example, 210 in FIG. 2) configured to control a brake (for example, 220 in FIG. 2) of a vehicle (for example, 1 in FIG. 1) based on a signal from a brake operation unit (for example, 8*a*, 16, 26 in FIG. 2), the vehicle control apparatus being capable of controlling the brake (220) of the vehicle (1) by a brake-by-wire method, comprising supplying power of a battery power supply (for example, 30 in FIG. 2) of the vehicle (1) to the control unit (210) by a predetermined input operation in a handle locking state of the vehicle (1) (for example, 312 of ST31 in FIG. 3, 412 of ST41 in FIG. 4, 312 of ST51 in FIG. 5).

According to the vehicle control method of Arrangement 14, there can be provided a vehicle control method capable of supplying the power of the battery power supply of the straddle type vehicle to the control unit by the predetermined input operation in the handle locking state.

Arrangement 15. There is provided a non-transitory computer-readable storage medium storing a program for causing a computer to execute a vehicle control method in a vehicle control apparatus (for example, 200 in FIG. 2) including a control unit (for example, 210 in FIG. 2) configured to control a brake (for example, 220 in FIG. 2) of a vehicle (for example, 1 in FIG. 1) based on a signal from a brake operation unit (for example, 8*a*, 16, 26 in FIG. 2), the vehicle control apparatus being capable of controlling the brake (220) of the vehicle (1) by a brake-by-wire method, the vehicle control method comprising supplying power of a battery power supply (for example, 30 in FIG. 2) of the vehicle (1) to the control unit (210) by a predetermined input operation in a handle locking state of the vehicle (1) (for example, 312 of ST31 in FIG. 3, 412 of ST41 in FIG. 4, 312 of ST51 in FIG. 5).

According to the storage medium storing the program of Arrangement 15, there can be provided a storage medium storing a program capable of supplying, to the control unit, the power of the battery power supply of the straddle type vehicle by the predetermined input operation in the handle locking state.

The invention is not limited to the foregoing embodiments, and various variations/changes are possible within the spirit of the invention.

What is claimed is:

1. A straddle type vehicle including a vehicle control apparatus capable of controlling a brake by a brake-by-wire method, comprising:

a control unit configured to control the brake of the straddle type vehicle based on a signal from a brake operation unit; and a signal processing unit configured to supply power of a battery power supply of the straddle type vehicle to the control unit by a predetermined input operation in a handle locking state of the straddle type vehicle.

2. The vehicle according to claim 1, wherein the input operation includes an operation to an operation unit configured to release the handle locking state.

3. The vehicle according to claim 2, wherein the handle locking state is electronically controlled by the brake-by-wire method, and based on a signal input from the operation unit by the operation, the signal processing unit supplies the power of the battery power supply to the control unit, and the control unit activated based on the battery power supply controls the brake before release of the handle locking state.

4. The vehicle according to claim 1, wherein the input operation includes an operation to the brake operation unit, and based on a signal input from the brake operation unit by the operation, the signal processing unit supplies the power of the battery power supply to the control unit, and the control unit activated based on the battery power supply controls the brake before release of the handle locking state.

5. The vehicle according to claim 1, further comprising a detection unit configured to detect a tilt angle of the straddle type vehicle in a pitching direction, wherein if the tilt angle is not less than a threshold based on comparison between the tilt angle and the threshold, the control unit determines that the straddle type vehicle is in a tilt state and controls the brake.

6. The vehicle according to claim 5, wherein if the tilt angle is less than the threshold, the control unit determines that the straddle type vehicle is not in the tilt state and controls the brake at a first timing, and if the control unit determines that the vehicle is in the tilt state, the control unit controls the brake at a second timing earlier than the first timing.

7. The vehicle according to claim 6, wherein the control unit controls the brake at a timing earlier than the first timing as a degree of the tilt state is higher.

8. The vehicle according to claim 1, wherein the signal processing unit supplies the power of the battery power supply to the control unit based on a signal input at the time of an operation of the brake operation unit.

9. The vehicle according to claim 1, wherein a pressure sensitive unit configured to detect an applied pressure and outputting a signal corresponding to the detected pressure to the signal processing unit is arranged as the brake operation unit on a grip of a handle of the straddle type vehicle, and
the signal processing unit supplies the power of the battery power supply to the control unit based on the signal output from the pressure sensitive unit.

10. The vehicle according to claim 9, wherein the pressure sensitive unit is arranged in an inner circumferential direction of the grip, and a detection range of the pressure sensitive unit is formed in a half region of a region of the grip in the inner circumferential direction on a front side of the straddle type vehicle.

11. The vehicle according to claim 10, wherein
a convex portion is formed in part of a surface of the grip of the handle, and
the convex portion is formed within the detection range of the pressure sensitive unit.

12. The vehicle according to claim 9, wherein
the signal processing unit comprises a coefficient setting unit configured to set a coefficient for amplifying an electrical signal output from the pressure sensitive unit,
the signal processing unit inputs, to the control unit, a signal multiplied by the coefficient set by the coefficient setting unit, and
the control unit controls the brake so that a braking force based on the signal is generated.

13. A vehicle control apparatus capable of controlling a brake of a vehicle by a brake-by-wire method, comprising:
a control unit configured to control the brake of the vehicle based on a signal from a brake operation unit; and
a signal processing unit configured to supply power of a battery power supply of the vehicle to the control unit by a predetermined input operation in a handle locking state of the vehicle.

14. A vehicle control method in a vehicle control apparatus including a control unit configured to control a brake of a vehicle based on a signal from a brake operation unit, the vehicle control apparatus being capable of controlling the brake of the vehicle by a brake-by-wire method, comprising
supplying power of a battery power supply of the vehicle to the control unit by a predetermined input operation in a handle locking state of the vehicle.

15. A non-transitory computer-readable storage medium storing a program for causing a computer to execute a vehicle control method in a vehicle control apparatus including a control unit configured to control a brake of a vehicle based on a signal from a brake operation unit, the vehicle control apparatus being capable of controlling the brake of the vehicle by a brake-by-wire method, the vehicle control method comprising
supplying power of a battery power supply of the vehicle to the control unit by a predetermined input operation in a handle locking state of the vehicle.

* * * * *